United States Patent
Hofmann et al.

(10) Patent No.: US 10,259,974 B2
(45) Date of Patent: Apr. 16, 2019

(54) ROOF COATING SYSTEM

(71) Applicant: Amberger Kaolinwerke Eduard Kick GmbH & Co. KG, Hirschau (DE)

(72) Inventors: Hans-Jürgen Hofmann, Rottendorf (DE); Christian Kohl, Amberg (DE)

(73) Assignee: AMBERGER KAOLINWERKE EDUARD KICK GMBH & CO. KG, Hirschau (DE)

( * ) Notice: Subject to any disclaimer, the term of this patent is extended or adjusted under 35 U.S.C. 154(b) by 100 days.

(21) Appl. No.: 15/320,693

(22) PCT Filed: Jul. 1, 2015

(86) PCT No.: PCT/EP2015/064983
§ 371 (c)(1),
(2) Date: Dec. 20, 2016

(87) PCT Pub. No.: WO2016/001303
PCT Pub. Date: Jan. 7, 2016

(65) Prior Publication Data
US 2017/0190934 A1    Jul. 6, 2017

(30) Foreign Application Priority Data
Jul. 1, 2014   (EP) .................... 14175155.2

(51) Int. Cl.
*C09D 195/00*    (2006.01)
*E04D 7/00*    (2006.01)
(Continued)

(52) U.S. Cl.
CPC .......... *C09D 195/00* (2013.01); *C04B 18/023* (2013.01); *C04B 20/1033* (2013.01); *C04B 26/26* (2013.01); *C09D 5/004* (2013.01); *C09D 7/61* (2018.01); *C09D 7/65* (2018.01); *C09D 7/69* (2018.01); *E04D 7/00* (2013.01); *E04D 7/005* (2013.01); *C04B 2111/00482* (2013.01); *C04B 2111/00586* (2013.01); *C04B 2111/2076* (2013.01); *C04B 2111/27* (2013.01); *C04B 2111/80* (2013.01)

(58) Field of Classification Search
CPC .......... C09D 195/00; C09D 7/65; C09D 7/69; C09D 7/61; C09D 5/004; E04D 7/00; E04D 7/005; C04B 26/26; C04B 18/023; C04B 20/1033; C04B 2111/00482; C04B 2111/00586; C04B 2111/2076; C04B 2111/27; C04B 2111/80
USPC ........................................ 523/135
See application file for complete search history.

(56) References Cited

U.S. PATENT DOCUMENTS

| | | |
|---|---|---|
| 2005/0072114 A1 | 4/2005 | Shiao et al. |
| 2011/0081537 A1 | 4/2011 | Sexauer et al. |
| | (Continued) | |

FOREIGN PATENT DOCUMENTS

| | | |
|---|---|---|
| WO | WO-2011/041033 A1 | 4/2011 |
| WO | WO-2013/192336 A1 | 12/2013 |

OTHER PUBLICATIONS

International Search Report in International Application No. PCT/EP2015/064983, dated Oct. 16, 2015.

*Primary Examiner* — David T Karst
(74) *Attorney, Agent, or Firm* — Venable LLP; Henry J. Daley

(57) ABSTRACT

The invention relates to a roof coating comprising a bitumen layer with embedded particles.

14 Claims, 2 Drawing Sheets

(51) Int. Cl.
    *C04B 26/26*     (2006.01)
    *C04B 18/02*     (2006.01)
    *C04B 20/10*     (2006.01)
    *C09D 7/65*     (2018.01)
    *C09D 7/40*     (2018.01)
    *C09D 7/61*     (2018.01)
    *C09D 5/33*     (2006.01)
    *C04B 14/04*     (2006.01)
    *C04B 14/06*     (2006.01)
    *C04B 14/10*     (2006.01)
    *C04B 24/42*     (2006.01)
    *C04B 24/26*     (2006.01)
    *C04B 111/00*     (2006.01)
    *C04B 111/20*     (2006.01)
    *C04B 111/27*     (2006.01)
    *C04B 111/80*     (2006.01)

(56) References Cited

U.S. PATENT DOCUMENTS

2011/0086201 A1     4/2011   Shiao et al.
2012/0296029 A1*  11/2012  Liu .................... C08F 293/005
                                                  524/520
2015/0192698 A1*   7/2015  Joedicke ................ G02B 1/02
                                                  52/747.1

* cited by examiner

ROOF COATING SYSTEM

The present invention relates to a roof coating.

Bitumen coatings are common as roof coatings in many countries, especially in the USA and Canada. In many cases, bitumen shingles are employed.

The corresponding roof coatings are black and therefore show a very low reflectance of solar irradiation (solar reflectance).

It is known to provide corresponding bitumen coatings with granules that increase solar reflectance, inter alia. For example, it is prescribed by law in California that corresponding materials must have a solar reflectance of at least 70%. A high reflectance saves air-conditioning costs of the building in warm months or regions.

WO 2011/041033 relates to a roof coating system in which calcined china clay particles are used to achieve a solar reflectance of at least 70%. The production of the correspondingly calcined china clay is complicated and energy-intensive.

WO 2013/192336 A1 relates to fired materials containing from 40 to 80% by weight china clay, from 0 to 40% by weight silica, and from 10 to 40% by weight sintering aids, among which up to 25% by weight, based on the total raw materials, may be feldspar. The materials are highly porous.

It has also been tried to apply aggregates. While these are relative cost-effective in production, the solar reflectance does not reach the desired values.

Further, it is to be noted that many of the roof coating systems tend to change their solar reflectance with time. This happens, in particular, when the embedded particles become soiled with bitumen in the course of ageing processes, and their solar reflectance is thus deteriorated.

It is the object of the present invention to provide roof coating systems that overcome at least some of the drawbacks of the prior art.

In one embodiment, this object is achieved by a roof coating comprising a bitumen layer with embedded particles, wherein the particles are coated with a fluorine-containing polymer.

Thus, according to the invention, a roof coating is provided that comprises a bitumen layer. Particles are embedded into this bitumen layer, and these particles are coated with a fluorine-containing polymer.

Preferably, the fluorine-containing polymer is a thermoplastic fluoropolymer, methacrylates and acrylates being particularly preferred. Fluorinated siloxanes are also particularly suitable.

The amount of fluorine-containing polymer, based on the weight of the particles, is preferably within a range of from 0.1 to 2.0% by weight.

Another embodiment of the invention relates to a roof coating comprising a bitumen coating with embedded particles, wherein said particles comprise particles that are a fired mixture of from 40 to 70% by weight clay minerals;
from 0 to 40% by weight crystalline silicas;
from 20 to 45% by weight feldspar;
from 0 to 15% by weight other aggregates.

In principle, it is preferred that the roof coating comprise only the particles used according to the invention. There may be application cases in which small amounts of other particles are contained in the roof coating.

Preferably, the proportion of the particles according to the invention is at least 50% by weight, more preferably at least 70% by weight, or at least 90% by weight.

In a preferred variant, the particles comprise particles that are a fired mixture of from 40 to 70% by weight clay minerals;
from 0 to 32% by weight crystalline silicas;
from 28 to 45% by weight feldspar;
from 0 to 15% by weight other aggregates.

In particular, china clay, dickite, halloysite and vermiculite and related minerals are suitable as clay minerals. Preferably, at least 50% by weight of the clay minerals consists of china clay.

Preferably, the proportion of clay minerals in the mixture to be fired is 45% by weight or more. Preferably, the proportion of clay minerals is 65% by weight or less, or 60% by weight or less.

Preferably, a clay mineral is used that contains a low proportion of iron, especially less than 1% by weight, based on the clay minerals, more preferably less than 0.5% by weight, based on the clay minerals. The iron content is expressed as $Fe_2O_3$.

In particular, quartz, cristobalite, tridymite and related minerals are suitable as crystalline silicas. The use of quartz is particularly preferred. Preferably, the proportion of quartz in the crystalline silicas is at least 50% by weight.

Preferably, the proportion of crystalline silicas is 5% by weight or more, or 9% by weight or more. Preferably, the proportion of crystalline silicas is 30% by weight or less, 25% by weight or less, or 18% by weight or less.

The proportion of feldspar is preferably 28% by weight or more, or 31% by weight or more. Preferably, the proportion of feldspar is 40% by weight or less.

In a preferred embodiment, a mixture is fired that comprises from 45 to 65% by weight clay minerals;
from 5 to 18% by weight crystalline silicas;
from 25 to 40% by weight feldspar; and
from 0 to 10% by weight other aggregates;

or from 45 to 65% by weight clay minerals;
from 5 to 18% by weight crystalline silicas;
from 28 to 40% by weight feldspar;
from 0 to 10% by weight other aggregates.

In particular, alumina ($Al_2O_3$), tectosilicates other than feldspars, phyllosilicates other than clay minerals are suitable as said other aggregates.

Preferably, the proportion of other aggregates is at least 1% by weight. Preferably, the proportion of other aggregates is 10% by weight or less.

The fired mixtures according to the invention may be fired at temperatures of about 1150° C., while the calcination of china clay is effected at about 1380° C. This provides a significant saving of energy.

Preferably, the relevant mixture has an open porosity of from 0 to 14% by weight, or from 2 to 14% by weight, preferably from 4 to 10% by weight, after firing. The porosity is measured according to DIN EN 993-1 "Methods of test for dense shaped refractory products—Part 1: Determination of bulk density, apparent porosity and true porosity".

Basically, a porous structure increases light scattering and thus leads to a higher solar reflectance. The above mentioned WO 2013/192336 discloses a porosity within a range of 20 to 50%, measured by mercury porosimetry, for improving the reflectance. Surprisingly, however, this increases the susceptibility to soiling in contact with the bitumen, i.e., over an application period of some years, the surface of corresponding products changes its color, which then leads to a large reduction of solar reflectance. Surprisingly, improved products can be obtained by reducing porosity. This can be achieved by increasing the proportion of feldspar in the mixture.

In some embodiments, the fired particles can have a particle coating. In particular, silicon-containing compounds, fluorine-containing compounds, silicon-fluorine-containing compounds, and mixtures thereof are suitable for such particle coating. The use of fluorine-containing compounds is particularly preferred, the fluorine-containing compounds preferably being thermoplastic fluoropolymers, such as fluorine-containing methacrylates and acrylates, or fluorinated siloxanes.

It has been found that a particle size within a range of from 0.1 to 3 mm (measured as d50) is particularly suitable; d50 means the grain size for which 50% by weight of the particles have a larger grain size, and 50% by weight have a smaller grain size. Such grain size distributions can be determined simply by means of grading curves determined according to DIN 66165 Part 1 "Sieve Analysis—Fundamentals" and DIN 66165 Part 2 "Sieve Analysis—Procedure".

An amount of about 0.5 to 5 kg of particles per m² of roof coating has proven suitable. Preferably, the roof coating according to the invention has a solar reflectance of at least 80%. It is measured according to ASTM Standard C1549 "standard test method for determination of solar reflection near ambient temperature using a portable solar reflectometer".

The invention further relates to the use of particles selected from particles coated with a fluorine-containing polymer and particles being fired mixtures of from 40 to 70% by weight clay minerals;

from 0 to 40% by weight crystalline silicas;

from 20 to 45% by weight feldspar;

from 0 to 15% by weight other aggregates;

for the coating of bitumen products for roof coverings.

Preferably, such particles have a composition of from 40 to 70% by weight clay minerals;

from 0 to 32% by weight crystalline silicas;

from 28 to 45% by weight feldspar;

from 0 to 15% by weight other aggregates.

"Embedded" means that the particles are firmly bound to the bitumen layer, so that the particles of a roof coating according to the invention withstand gravity at 25° C. and remain embedded. On the other hand, the particles must be partially exposed in order to perform their task of solar reflection. Preferably, at least 50% of the particle surface is not coated with bitumen.

The particles according to the invention exhibit an improved ageing resistance, because bitumen does not wet the surface, and the particles are exposed. On the other hand, surprisingly, the adherence to the bitumen is not disturbed to the extent where the particles could become detached from the roof coating, for example, by gravity or wind.

FIGS. 1 and 2 show embodiments after a soiling test.

The invention is further illustrated by the following Examples:

EXAMPLE 1: PREPARATION

The following particles were prepared:

|  | Sample 1 | Sample 2 | Sample 3 |
| --- | --- | --- | --- |
| China clay | 59.88% by weight | 49% by weight | 46.6% by weight |
| Quartz flour | 8.97% by weight | 16% by weight | 15.1% by weight |
| Feldspar | 31.15% by weight | 35% by weight | 33.3% by weight |
| Aluminum oxide | — | — | 5.0% by weight |

All three samples were fired at 1150° C. under oxidizing conditions, and subsequently crushed to a grain size d50 of 1 mm.

EXAMPLE 2: WATER ABSORPTION

The samples were weighed exactly in beakers and then soaked with a large excess of water. After 60 min at 25° C., the particles were filtered off, carefully dabbed and weighed again.

The samples showed the following water absorption:

| Sample 1 | Sample 2 | Sample 3 |
| --- | --- | --- |
| 10.2% by weight | 8.4% by weight | 9.4% by weight |

EXAMPLE 3: SOLAR REFLECTANCE

The total solar reflection is measured for an incident angle of 20° to the vertical by means of a reflectometer "SSR-ER" of the company Devices and Services Co. of Dallas, Tex. Thus, a representative and sufficiently large partial quantity of the sample to be measured is removed. A sample dish with a diameter of 55 mm is filled with the sample to a level of 10 mm, and the surface is leveled with a spatula. The solar reflectance is stated as a mean of five measurements. The particles had the following solar reflectance:

| Sample 1 | Sample 2 | Sample 3 |
| --- | --- | --- |
| 83.8% | 84.1% | 85.1% |

The fired china clay as used in the prior art has a solar reflectance of about 81-83%.

EXAMPLE 4: COATING

The particles according to the invention were then mixed with a fluorine-containing polymer (commercially available as "Unidyne TG-8111" of the company Daikin Chemicals Ltd.) in amounts of 0.4% by weight, based on the particles, or 0.6% by weight, based on the particles, wherein the fluoropolymer was previously diluted with water at a ratio of 1:5 to ensure a better contact of the particle surface with the polymer.

The following solar reflectance was obtained:

| Sample 1 - 0.4% | Sample 2 - 0.4% | Sample 3 - 0.4% |
|---|---|---|
| 81.8% | 83.9% | 84.7% |
| Sample 1 - 0.6% | Sample 2 - 0.6% | Sample 3 - 0.6% |
| not determined | 83.6% | 84.8% |

It is found that the fluorine coating does not significantly deteriorate the solar reflectance.

China clay fired at 1380° C. may also be provided with such a coating. The following values of solar reflectance were obtained:

| Sample - untreated | Sample 2 - 0.4% | Sample 3 - 0.6% |
|---|---|---|
| 81.9% | 82.5% | 82.8% |

EXAMPLE 5: DISCOLORATION TEST

The hydrophobicity of the surface is evaluated by a discoloration test. Thus, 5 g of the granules to be evaluated is intimately mixed with 1.2 g of methyl red reagent (prepared from 7 mg of methyl red, CAS No. 845-10-3 in 200 ml of a 0.02 M sulfuric acid) and 5 ml of distilled water, collected by suction filtration and re-washed with water. Where no hydrophobicity could form, the granules show a reddish color. This is evaluated as "failed". The granules remain white only where hydrophobicity could form, which is evaluated as "passed".

| Fired china clay - untreated | | Fired china clay - 0.6% |
|---|---|---|
| F | | P |
| Sample 1 - 0.4% | Sample 2 - 0.4% | Sample 3 - 0.4% |
| P | F | P |
| Sample 1 - 0.6% | Sample 2 - 0.6% | Sample 3 - 0.6% |
| not determined | P | P |

F = failed
P = passed

EXAMPLE 6: FIXATION

Subsequently, it was examined whether the particles are embedded firmly enough in the bitumen coating. Thus, an amount of about 2 g of bitumen was heated at 200° C. at first in an aluminum dish to produce a smooth surface. The granules are then scattered thinly onto this surface, and all is stored in a heat cabinet at 80° C. for four days. The individual granules are removed using tweezers after cooling down to room temperature. It is evaluated whether there has been a cohesive failure within the bitumen layer or an adhesive failure.

| Fired china clay - untreated | | Fired china clay - 0.6% |
|---|---|---|
| C | | A |
| Sample 1 - 0.4% | Sample 2 - 0.4% | Sample 3 - 0.4% |
| A | C | C |
| Sample 1 - 0.6% | Sample 2 - 0.6% | Sample 3 - 0.6% |
| A | A | C/A |

C = cohesive failure
A = adhesive failure

It is found that the particles are embedded in the bitumen matrix relatively firmly. In a cohesive failure, the bitumen layer breaks before the particle is detached from the bitumen layer, while in an adhesive failure, the bitumen layer remains undamaged.

EXAMPLE 7: SOILING TEST

FIG. 1 shows fired china clay, untreated (bottom) and with 0.6% by weight fluorine coating (top).

Figure 1:
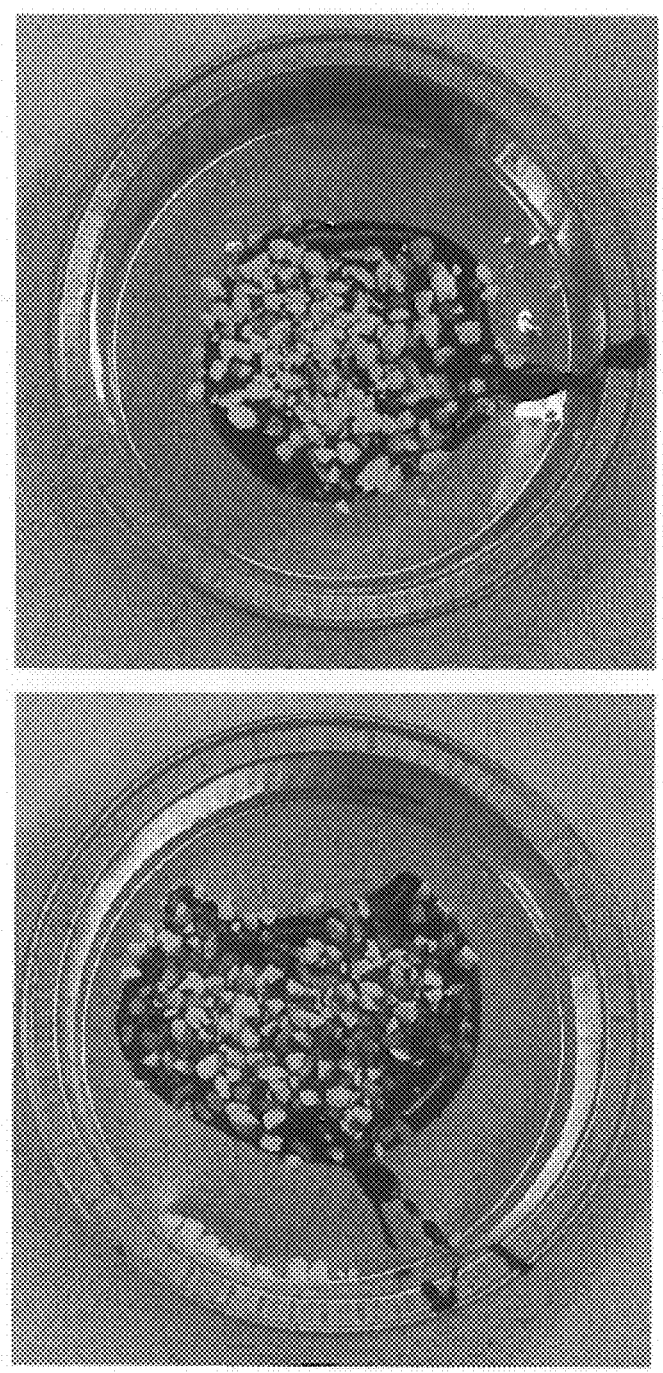
FIGS. 1 and 2 show a photograph according to Example 6 before the removal of the particles. After cooling, photographs were taken.
Figure 2:
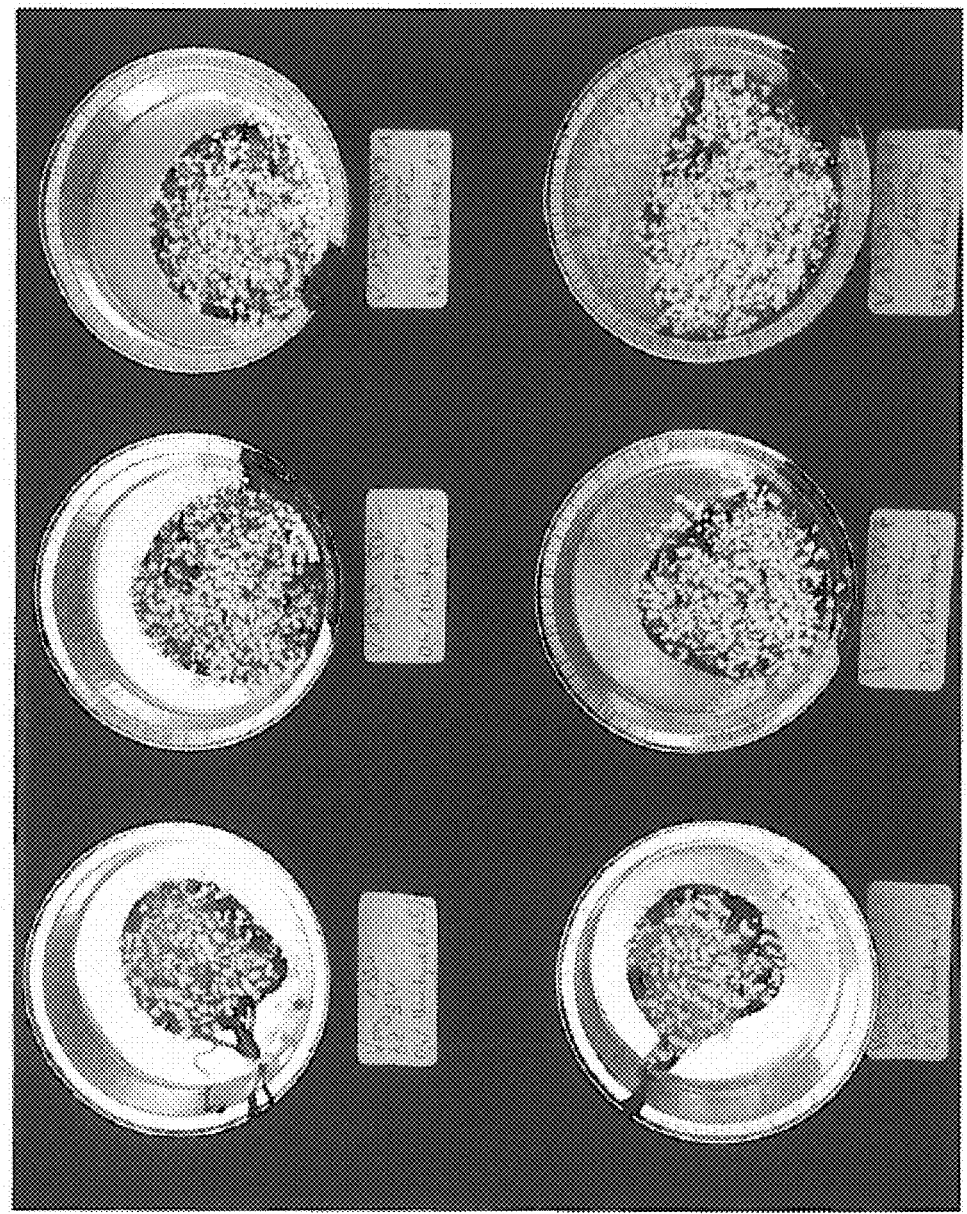

FIG. 2 shows samples 1, 2 and 3 with 0.4% by weight fluorine coating in the upper row, and samples 1, 2 and 3 with 0.6% by weight fluorine coating in the lower row.

In the sample according to the prior art (pure fired china clay, untreated), a clear adhesion of bitumen is shown. In the coated fired china clay and in all six samples of FIG. 2, it is shown that the bitumen does not wet the surface, or only slightly so, so that the particles can cause solar reflection.

All cited documents are fully included in the disclosure herein, unless such disclosure would be in contradiction to the teaching of the invention.

The invention claimed is:

1. A roof coating comprising a bitumen layer with embedded particles, wherein said embedded particles comprise particles that are fired mixtures of
   from 40 to 70% by weight clay minerals;
   from 0 to 32% by weight crystalline silicas;
   from 28 to 45% by weight feldspar;
   from 0 to 15% by weight other aggregates,
   wherein said fired mixtures have an open porosity of 0 to 14% by volume as measured according to DIN EN 993-1:1995.

2. The roof coating according to claim 1, wherein said particles have a grain size (d50) of 0.1 to 3 mm.

3. The roof coating according to claim 1, wherein said particles are present in an amount of 0.5 to 5 kg per square meter of roof coating.

4. The roof coating according to claim 1, wherein said particles have a particle coating.

5. The roof coating according to claim 4, wherein said particle coating is selected from the group consisting of the group consisting of silicon-containing compounds, fluorine-containing compounds, silicon-fluorine-containing compounds and mixtures thereof.

6. The roof coating according to claim 4, wherein said particle coating comprises a fluorine-containing polymer.

7. The roof coating according to claim 6, wherein said fluorine-containing polymer is present in an amount of 0.1 to 2.0% by weight, based on the particles.

8. The roof coating according to claim 6, wherein said fluorine-containing polymer is a thermoplastic fluoropolymer.

9. The roof coating according to claim 6, wherein said fluorine-containing polymer is a fluorinated poly(methacrylate) or a fluorinated silicone.

10. The roof coating according to claim 1, wherein said roof coating has a solar reflectance of at least 80% as measured according to ASTM Standard C1549-16.

11. The roof coating according to claim 1, wherein said mixtures comprise
    from 45 to 65% by weight clay minerals;
    from 5 to 18% by weight crystalline silicas;
    from 28 to 40% by weight feldspar;
    from 0 to 10% by weight other aggregates.

12. A process for preparing particles, comprising:
    a) firing a mixture of
        from 40 to 70% by weight clay minerals;
        from 0 to 32% by weight crystalline silicas;
        from 28 to 45% by weight feldspar;
        from 0 to 15% by weight other aggregates;
    b) crushing the mixture into particles,
    wherein said fired mixture has an open porosity of 0 to 14% by volume as measured according to DIN EN 993-1:199.

13. A method of using particles being fired mixtures of
    from 40 to 70% by weight clay minerals;
    from 0 to 32% by weight crystalline silicas;
    from 28 to 45% by weight feldspar;
    from 0 to 15% by weight other aggregates;
    comprising the steps of embedding said particles in bitumen,
    wherein said fired mixtures have an open porosity of 0 to 14% by volume as measured according to DIN EN 993-1:199.

14. The method of claim 13, wherein said particles are used for roof coverings.

* * * * *